United States Patent [19]

Rogers et al.

[11] Patent Number: 4,461,887

[45] Date of Patent: Jul. 24, 1984

[54] BIREFRINGENT POLYMER CONTAINING RECURRING UNITS FROM DIENOIC ACID

[75] Inventors: Howard G. Rogers, Weston, Mass.; Russell A. Gaudiana, Merrimack, N.H.; Jeannette S. Manello, Lawrenceville, N.J.; Ronald A. Sahatjian, Lexington, Mass.

[73] Assignee: Polaroid Corporation, Cambridge, Mass.

[21] Appl. No.: 498,497

[22] Filed: May 26, 1983

Related U.S. Application Data

[62] Division of Ser. No. 238,057, Mar. 2, 1981, Pat. No. 4,393,196.

[51] Int. Cl.³ ............................................. C08G 69/26
[52] U.S. Cl. .................................. 528/345; 528/341; 528/363
[58] Field of Search ...................... 528/345, 341, 363

[56] References Cited

U.S. PATENT DOCUMENTS

| | | | |
|---|---|---|---|
| 3,130,182 | 4/1964 | Frazer | 528/363 |
| 3,130,183 | 4/1964 | Frazer | 528/363 |
| 3,497,479 | 2/1970 | Cassar | 528/345 |
| 3,536,651 | 10/1970 | Frazer | 260/30.8 R |
| 3,607,810 | 9/1971 | Schopf et al. | 260/29.2 N |
| 3,671,542 | 6/1972 | Kwolek | 260/30.8 R |
| 3,869,429 | 3/1975 | Blades | 528/348 |
| 3,966,656 | 6/1976 | Hartzler | 260/29.2 N |
| 4,231,913 | 11/1980 | Kyritsos et al. | 528/345 |
| 4,359,568 | 11/1982 | Marvel et al. | 528/345 |
| 4,393,196 | 7/1983 | Rogers et al. | 528/363 |

OTHER PUBLICATIONS

Pryde-J. Macromol. Sci.-Rev. Macromol. Chem., C17(1), 1-35 (1979).

Primary Examiner—Harold D. Anderson
Attorney, Agent, or Firm—Louis G. Xiarhos

[57] ABSTRACT

Disclosed is a class of polymers comprising recurring units of the formula

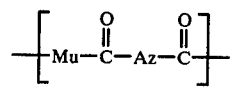

where Mu is a divalent radical having the formula

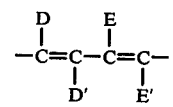

where each of D, D', E and E' is hydrogen, alkyl or substituted-alkyl; and Az is a divalent radical having the formula

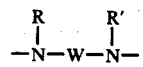

where each of R and R' is hydrogen, alkyl, aryl, alkaryl or aralkyl and W is a single bond, alkylene or alkenylene; or Az is a divalent radical having the formula

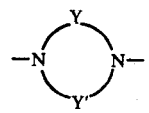

where each of Y and Y' represent the atoms necessary to complete a piperazine or substituted-piperazine radical.

Molecularly oriented polymers of the invention exhibit birefringence and can be utilized in filter, polarizing and other optical devices.

17 Claims, No Drawings

BIREFRINGENT POLYMER CONTAINING RECURRING UNITS FROM DIENOIC ACID

This is a division of application Ser. No. 238,057 filed Mar. 2, 1981, now U.S. Pat. No. 4,393,196.

BACKGROUND OF THE INVENTION

This invention relates to a novel class of polymers exhibiting optically anisotropic properties. More particularly, it relates to a class of birefringent polymers including recurring radicals derived from certain dienoic acids.

Materials having a birefringent character have been variously applied in connection with the construction of filter and other optical devices. Frequently, a birefringent element utilized in an optical filter or other device will comprise a plate made from a monocrystalline form of birefringent optical material. Single crystals are expensive materials and are not readily formed to the desired shape or conformation required in particular applications. The size to which such crystals can be grown represents an additional limitation on the utilization of such materials in optical devices.

Optical devices including a birefringent material in the form of a polymeric layer, such as may be formed by the unidirectional stretching of a suitable polymeric material, have also been described. Thus, light-polarizing devices utilizing a polymeric birefringent layer have been described in U.S. Pat. No. 3,213,753 (issued Oct. 26, 1965 to H. G. Rogers). Optical devices including polymeric birefringent materials have also been set forth, for example, in U.S. Pat. No. 3,506,333 (issued Apr. 14, 1970 to E. H. Land) and in U.S. Pat. No. 3,610,729 (issued Oct. 15, 1971 to H. G. Rogers). Frequently, the efficient operation of an optical filter, polarizing or other optical device including a birefringent element or material will depend upon the realization of large net differences in refractive index between a birefringent material and adjacent or contiguous materials. In general, such net differences will be maximized where a birefringent material is highly birefringent. Correspondingly, large net differences in refractive indices of contiguous materials will be unattainable where birefringent polymeric materials otherwise suited to application in an optical device tend to exhibit either low or only marginal birefringent character. Accordingly, polymeric materials which exhibit a useful birefringent character will be of particular interest for application in the construction of filter, polarizing, and other optical devices.

SUMMARY OF THE INVENTION

The present invention provides a class of polymers which comprise recurring units including certain radicals derived from a dienoic acid. It has been found that anisotropic or birefringent character is observed in the case of polymers of the present invention which comprise certain repeating or recurring units in chain-extended relation, the recurring units including divalent radicals derived from a dienoic acid. The presence of such radicals in the recurring units such that there is provided a distribution of high electron density about the long axis of the polymer is believed to contribute to the observed birefringent or anisotropic character. The present invention, thus, provides a class of polymeric materials comprising recurring units of the formula

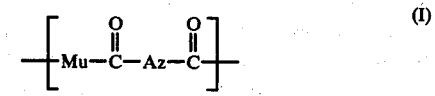

where Mu is a divalent radical having the formula

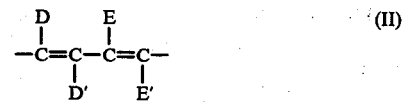

where each of D, D', E and E' is hydrogen, alkyl or substituted alkyl; and Az is a divalent radical having the formula

where each of R and R' is hydrogen, alkyl, aryl, alkaryl or aralkyl and W is a single bond, alkylene or alkenylene; or Az is a divalent radical having the formula

where each of Y and Y' represent the atoms necessary to complete a piperazine or substituted-piperazine radical.

DETAILED DESCRIPTION OF THE INVENTION

As described hereinbefore, the polymeric materials of the present invention comprise recurring units of the formula

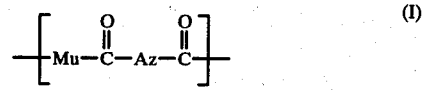

wherein divalent radical Mu conforms to the structure

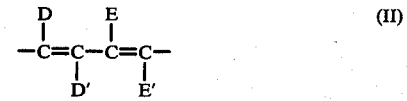

It will be appreciated from inspection of the nature of radical Mu that such radical may be considered to be derived from a dienoic acid in view of the presence therein of conjugated double bonds. In radical Mu, each of D, D', E and E' can represent hydrogen; alkyl (e.g., methyl, ethyl, n-propyl); or substituted-alkyl (e.g., trichloromethyl, trifluoromethyl). When each of D, D', E and E' is, for example, hydrogen, radical Mu will be the trans-trans-1,4-butadienylene radical, as may be derived from muconic acid. Similarly, when each of D and E' (each positioned on a carbon atom alpha- with respect to a carbonyl group) is methyl and each of D' and E (each positioned on a carbon atom beta- to a carbonyl group) is hydrogen, radical Mu will be the 1,4-dimethyl-trans-trans-1,4-butadienylene radical as may be derived from α,α'-dimethylmuconic acid.

Each of the D, D', E and E' moieties of the divalent Mu radical can be the same or different. It will be preferred, however, that the α- and α'-substituents (D and E') be the same and that the β- and β'-substituents (D' and E) be the same. Preferably, each of D, D', E and E' will be hydrogen. Also preferred is the Mu radical wherein D and E' are each methyl and D' and E are each hydrogen.

The radical Mu is referred to hereinafter for convenience as a muconic radical. It will be appreciated, however, from the nature of the D, D', E and E' radicals hereinbefore defined that the Mu radical is not to be construed as being limited to a derivative derived from muconic acid per se but that other Mu radicals of the dienoic acid class represented by formula (II) are contemplated as within the scope of the present invention.

The divalent Az radical of the recurring units of formula (I) can conform to the structural formulas (III) and (IV). Thus, radical Az can conform to the formula

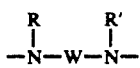
(III)

wherein each of R and R' is hydrogen; alkyl (e.g., methyl, ethyl, n-propyl, n-hexyl); aryl (e.g., phenyl); alkaryl (e.g., tolyl); or aralkyl (e.g., benzyl); and wherein W represents a single bond; alkylene (e.g., methylene, ethylene, 1,2-propylene, 1,3-propylene, 1,6-hexylene); or alkenylene (e.g., butenylene-2).

It will be appreciated that when W represents a single bond, the Az radical will conform to the structure of an azide, e.g., a hydrazide. Thus, a representative and preferred class of polyhydrazides of the invention comprises recurring units conforming to the formula:

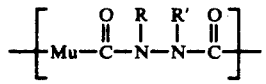
(V)

wherein Mu is a muconic radical as hereinbefore defined and R and R' are as defined hereinbefore and, preferably, hydrogen. Such polyhydrazides can be obtained by reaction of a muconic acid halide and hydrazine.

Radical W can also be an alkylene or alkenylene radical as hereinbefore defined. It will be appreciated that the polymers of the invention will be polyamides where W is an alkylene or alkenylene radical. Inasmuch as compounds containing amino groups directly bonded to carbon atoms having linear unsaturation are not stable, the unsaturation of alkenylene radical W will not be present at either terminal carbon atom of the alkenylene radical. A suitable alkenylene radical W is butenylene-2. A suitable class of muconic polyamides comprises recurring units conforming to the formula

(VI)

wherein W is a divalent alkylene or alkenylene radical and Mu is a muconic radical as hereinbefore defined. These polyamides can be conveniently provided by reaction of a muconic acid halide and an alkylene diamine or alkenylene diamine.

Radical Az can also conform to the formula

(IV)

wherein each of Y and Y' represent the atoms necessary to complete a piperazine or substituted-piperazine radical. Thus, radical Az can be the radical

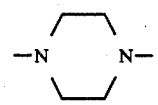

in which case each of Y and Y' is —CH₂CH₂—. Suitable substituted-piperazine radicals include

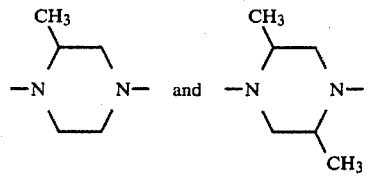

A preferred class of muconic piperazide polymers comprises recurring units conforming to the formula

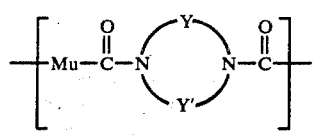
(VII)

wherein each of Mu, Y and Y' is as defined hereinbefore and wherein preferably Y, Y' and the nitrogen atoms to which they are bonded complete a substituted-piperazine, e.g., a 2-methylpiperazine or 2,5-dimethylpiperazine radical.

The polymers of the present invention can be prepared by resort to synthetic routes involving the reaction of a dienoic acid halide having the formula

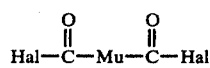

(where Mu has the meaning hereinbefore set forth as radical II and Hal represents halogen, e.g., bromide or chloride) with a hydrazine or amine having the formula H—Az—H (where Az is a radical III or IV as defined hereinbefore). This synthetic route is illustrated as follows by reference to the preparation of poly(muconic hydrazide) by reaction of muconic acid chloride with hydrazine:

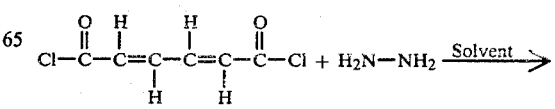

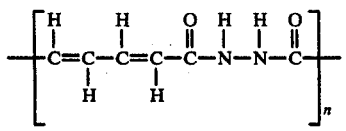

According to an alternative procedure, a diazide (or diamide) can be prepared by reaction of the dienoic acid halide,

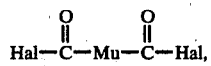

with the hydrazine (or amine) and the resulting diazide or diamide can then be reacted with additional dienoic acid halide. Thus, poly(muconic hydrazide) can be prepared by reaction of muconic dihydrazide with muconic acid chloride. In accordance with either of the preparative routes set forth herein, it will be desirable that proportions of reactants be chosen such that there will be present in the resulting polymer substantially one mole of dienoic acid halide for each mole of hydrazine (or diamine) or dieonic acid dihydrazide (or diamide). It is preferred to prepare the polymers hereof by a synthetic route involving the reaction of a dienoic acid halide with a hydrazine or diamine conforming to the formula H—Az—H where Az is a radical of the formula III or IV set forth hereinbefore.

The polymers of the present invention can be prepared by resort to a solution polymerization technique. Suitable solvent materials include those which exhibit solvent power for the reactants and which are weakly basic so as, for example, to serve as hydrogen acceptors for hydrogen chloride evolved during the polymerization reaction. Examples of suitable solvents include amide and urea solvents such as N-methylpyrrolidone, N,N,N',N'-tetramethylurea and N,N-dimethyl acetamide. Other suitable reaction solvent materials include tetrahydrofuran; N-methylpiperidone-2; N,N-dimethylpropionamide; N-methyl-caprolactam; hexamethylpropionamide and N,N'-dimethylethylene urea. A salt such as lithium carbonate can be employed as a hydrogen acceptor. The polymerization can be conducted by dissolving the reaction monomers to be polymerized in the reaction solvent and allowing the exothermic polymerization reaction to occur. Preferably, the polymerization will be conducted at a low temperature, below about 5° C. and preferably in the range of about −5° C. to about 10° C. External cooling is utilized where necessary to maintain a desired low polymerization temperature. Such low temperatures are desired from the standpoint of minimizing the reaction of basic solvent materials and the reactants. These solvent materials are appreciably reactive with the dienoic acid halides, particularly at elevated temperatures.

An inorganic halide such as lithium chloride can be utilized in the polymerization solvent if desired. Such salts promote solubilization of the polymerization product and assist in the maintenance of a fluid reaction mixture. Lithium chloride is especially useful for these purposes.

A preferred polymerization method for the preparation of the polymers hereof involves an interfacial polymerization technique. According to this method, polymerization is conducted at the interface of mutually immiscible solvent materials, one of which solvents provides solvent power for the resulting polymer. A solvent system based upon chloroform or carbon tetrachloride and water can be suitably utilized for the interfacial polymerization of a dienoic acid halide and a hydrazine (or amine). Thus, an aqueous solution of hydrazine (or amine reactant) is prepared to which is added sodium carbonate or other base to neutralize hydrochloric acid formed during polymerization. The aqueous solution is agitated, for example, with the aid of a blender and there is rapidly added a solution of the dienoic acid halide in organic solvent such as chloroform. Polymerization is, thus, allowed to occur at the interface of the mutually immiscible phases. The polymerization is conveniently conducted at room temperatures. External cooling can be utilized to maintain desired temperature. The polymer can be filtered, washed and recovered from the organic phase.

Dienoic acid halides which can be utilized for the preparation of the polymers of the present invention include muconic acid chloride; α,α'-dimethylmuconic acid chloride; β,β'-dimethylmuconic acid chloride; α,α'-bis(trifluoromethyl)muconic acid chloride; β,β'-bis(trifluoromethyl)muconic acid chloride; α,β'-bis(trifluoromethyl)muconic acid chloride; and the corresponding acid bromides. Mixtures of dienoic acid halides can be utilized for reaction with a suitable hydrazine or amine. Thus, for example, a mixture of muconic acid chloride and α,α'-dimethylmuconic acid chloride can be reacted with hydrazine for production of a copolyhydrazide comprised of the following recurring units

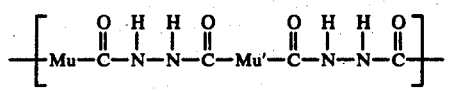

wherein Mu is the divalent radical derived from muconic acid chloride and Mu' is the divalent radical from α,α'-dimethylmuconic acid chloride.

Suitable hydrazine and amine reactants useful for reaction with the dienoic acid halides hereof in the production of polymers of the invention include those conforming to the formula H—Az—H where Az is a radical of the formula III or IV. Preferred reactants include hydrazine; 1,4-diaminobutene-2; piperazine; 2-methylpiperazine and 2,5-dimethylpiperazine. Mixtures can be suitably employed. Thus, a dienoic acid chloride (or a mixture of such chlorides) can be reacted, for example, with a mixture of hydrazine and piperazine. An example of a polymer prepared in such manner is a polymer containing the following recurring units

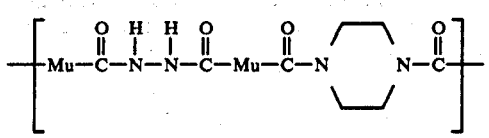

where each Mu is the same or different muconic radical as defined hereinbefore.

While the polymers of the present invention are described as comprising recurring units of formula I, i.e., units conforming to the structure

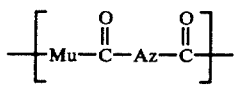

the polymers can also include recurring units not comforming to the structure of Formula I. Examples of such units which can be present in the polymers in proportions which do not undesirably reduce the birefringent properties of the polymers include for example, recurring units having the formulas

wherein R and R' are hydrogen, alkyl, aryl or the like and A and A' are divalent radicals such as 1,4-phenylene; 4,4'-biphenylene; vinylene; 2,4'-trans-vinylenephenylene; or 4,4'-stilbene. Other divalent radicals can, however, serve as radicals A and A'. It will be appreciated that compounds wherein carbon atoms with aliphatic unsaturation are directly bonded to nitrogen atoms are unstable and, accordingly, radicals such as vinylene will not serve as A or A' radicals where such radicals are bonded to nitrogen.

Where additional recurring units of the aforesaid type are present in the polymers of the present invention, it will be preferred that such units comprise units which can contribute to the birefringent character of the polymers. Such preferred units will comprise recurring units which are characterized by a substantially cylindrical distribution of electron density about the long axis thereof and a rigid rod-like character. Such character can be most nearly attained by the presence of substituent moieties on aromatic nuclei such that the aromatic nuclei are present in the recurring units in a non-coplanar molecular configuration. Examples of these preferred radicals which can serve as A and/or A' in the aforesaid recurring units include substituted-biphenylene radicals of the formula:

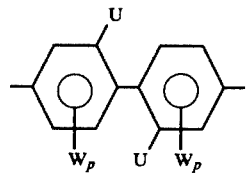

wherein each U is a substituent other than hydrogen, each W is hydrogen and each p is an integer from 1 to 3 and where the U and Wp substitution is sufficient to provide the radical with a non-coplanar molecular configuration. Also suitable are substituted stilbene radicals of the formula

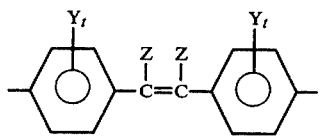

where each of Y and Z is hydrogen or a substituent other than hydrogen and each t is an integer from 1 to 4, with the proviso that when each said Z is hydrogen, at least one Y substituent is a substituent other than hydrogen positioned on the corresponding nucleus ortho with respect to the

moiety of said radical, the Z and $Y_t$ substitution being sufficient to provide the radical with a non-coplanar molecular configuration. Such preferred substituted-biphenylene and substituted-stilbene radicals and methods for preparing polymers containing same are described in detail in the U.S. patent application of H. G. Rogers et al. (Ser. No. 217,548), filed of even date herewith, now U.S. Pat. No. 4,352,871.

Other preferred divalent radicals which can serve as radicals A and/or A' include the substituted-quaterphenyl radicals of the following formula:

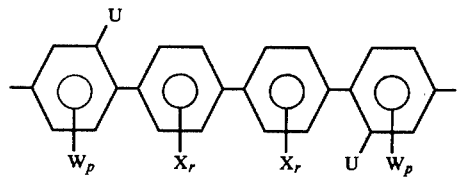

where each U is a substituent other than hydrogen, each W is hydrogen or a substituent other than hydrogen, each p is an integer from 1 to 3, each X is hydrogen or a substituent other than hydrogen and each r is an integer from 1 to 4, said $U$, $W_p$ and $X_r$ substitution being sufficient to provide said radical with a non-coplanar molecular configuration.

Recurring units containing these radicals are characterized by a substantially cylindrical distribution of high electron density about the long axis thereof and promote high birefringence and improved solubility. Examples of such radicals and the preparation of polymers containing same is described in detail in the patent application of R. A. Gaudiana et al., Ser. No. 239,180, filed of even date herewith, now U.S. Pat. No. 4,393,194.

The polymers of the present invention are especially advantageous from the standpoint of the provision of materials exhibiting birefringent character. These polymers as prepared and in solution in a suitable reaction solvent, exist in an unoriented and non-birefringent form. The polymers respond, however, to stress and exhibit birefringent character. Thus, where a molecular orientation is permanently induced in the polymer material, as by formation of the polymer material into an oriented sheet, fiber or other form, the polymer will exhibit optical birefringence which can be measured in accordance with a number of known methods.

In general, the polymers of the present invention exhibit solubility in select solvents and transparency. It will be appreciated, however, that such properties will vary with the particular nature of the recurring units which comprise the polymers and, as regards, solubility, will depend upon the particular solvents utilized. For example, polymers containing radicals from α,α'-dimethylmuconic acid exhibit greater solubility in such solvents as trifluoroacetic acid, cresol, chloroform and methanol than corresponding polymers containing radicals from muconic acid per se. In general, greater solubility is exhibited by polymers containing substituted piperazine radicals than corresponding polymers from piperazine. In general, the polymers of the present invention are transparent materials although the polypiperazides may tend to exhibit cloudiness. Thus, the polymers can be stretched to provide desired molecular orientation with provision of a generally transparent material exhibiting birefringence.

Known shaping or forming methods can be utilized for the orientation of polymeric materials of the present invention. Preferably, this will be accomplished by unidirectional stretching of a polymeric film, by extrusion of the polymer into a sheet, layer or other stretched form, or by the combined effects of extrusion and stretching. In their oriented state, the polymers of the invention exhibit birefringence. In general, greater birefringence will be observed in the case of polymeric materials exhibiting a greater degree of molecular orientation. As indicated hereinbefore, the polymers can be suitably dissolved in select solvents such that handling and fabrication of the polymers into films or the like can be accomplished. Fibers can also be formed by resort to spinning and other known fiberforming techniques. Various adjuvants can be employed in the production of film, fiber or other polymeric forms to promote stability, improved processing or the like. For example, UV stabilizers, plasticizers or like additives can be employed to provide improved stability or provide improved elasticity or processing efficiencies.

The birefringent properties of polymers of the present invention can be determined by the measurement of physical and optical parameters in accordance with known principles of physics and optics. Thus, for example, the birefringence ($\Delta n$) of a suitable birefringent polymeric material can be determined by the measurement of optical phase retardation (R) and film thickness (d) and calculation of birefringence in accordance with the relationship $$\Delta n = \frac{R\lambda}{d}$$

where $\lambda$ represents the wavelength of light utilized for the conduct of the measurements. Alternatively, parallel refractive index and perpendicular refractive index of the film material can be measured utilizing Becke line analysis or critical angle measurement.

A preferred method for determining the birefringence of polymers of the invention involves the measurement of retardation of the polymeric material by a method utilizing principles of polarized-light microscopy and interferometry. Such method provides desired precision and accuracy in the measurement of the phase difference between a sample ray passing through a sample of polymeric material and a reference ray passing through a neighboring empty area (embedding medium or air) of the same thickness. The light emitted by a low-voltage lamp of a microscope is linearly polarized by passage through a polarizer and, in turn, is passed through a condenser, a calcite plate beam splitter, a half-wave retarder plate, the polymeric sample, a beam recombinator calcite plate, and through an analyzer whose transmission direction is vertical to that of the polarizer (crossed position). In the analyzer the components vibrating in its absorption direction are extinguished, whereas the components of both rays in the transmission direction are transmitted and interfere. The phase difference between sample and reference beams, caused by the molecular structure of configuration of the polymeric sample, is measured with compensators. From these measurements, the thickness and refractive index of the polymeric material can be determined. By determining index of refraction of the polymeric sample for both parallel and perpendicular directions, birefringence can, by difference, be determined. A suitable method and apparatus for determining phase retardation, index of refraction and birefringence for the polymeric materials utilized herein is a pol-interference device according to Jamin-Lebedeff described in greater detail by W. J. Patzelt "Polarized-light Microscopy", Ernest Leitz GmbH, Wetzlar, West Germany, 1974, page 92.

It has been found that the birefringent character of a chain-extended polymer comprising an end-to-end combination of certain recurring units is importantly related to the electron density distribution about the long axes of the recurring units and the resulting polymer and to the molecular configuration of the recurring units. Accordingly, there is set forth in the application of H. G. Rogers et al., Ser. No. 238,054, filed of even date herewith, now U.S. Pat. No. 4,446,305, a dimensionless geometric index G related to birefringence and represented by the relationship $$G = 0.222 \times E \times \frac{L}{D}$$

wherein E is a dimensionless eccentricity factor defined by the relationship $$E = \frac{1 + e_L}{1 + e_T}$$

where $e_L$ is the longitudinal eccentricity of the polarizability of the repeating molecular unit and $e_T$ is the transverse eccentricity of the electron polarizability of the repeating molecular unit, L is the length of the repeating molecular unit along the main axis thereof and D is the mean diameter of the repeating molecular unit. The contribution to birefringence of the molecular structure of a repeating, chain-extending unit and of electron density distribution will be better understood by consideration of the nature of a repeating chain-extending molecular unit of a polymeric material. Each repeating unit may thus be visualized as a repeating rod-like segment of finite length L, and of a generally cylindrical configuration. Birefringence has been found to be importantly related to the molecular structure of the repeating units of the polymer in accordance with the relationship of geometric index G, set forth hereinbefore. A birefringent polymer of the invention will thus comprise a plurality of molecular units in chain-extended relation relative to the X axis. The X axis forms a right angle with respect to Y and Z axes. The mean diameter D, set forth in the geometric index G, is determined for each repeating unit by the expression $$D = \frac{Y + Z}{2}.$$

In addition to a rigid rod-like geometry in a polymeric material as the result of an end-to-end combination of repeating units hereof, the electron density distributed around the long axis of the polymer, variously treated as a cylindrical or ellipsoidal distribution, is believed to comprise a major contributing factor to optical anisotropy or birefringence. High electron density substantially cylindrically distributed around the long axis of a polymer is exhibited in a polymer comprising the recurring units of the formula I hereof. Electron density distribution about axis X will be variously treated as a cylindrical or ellipsoidal distribution depending upon the relative magnitudes of the Y and Z vectors. Ideally, Y and Z vectors would be equal resulting in a circular cross-sectional distribution along the X axis.

By a combination of longitudinal eccentricity ($e_L$) and transverse eccentricity ($e_T$), based upon bond and group polarizabilities, and the length and mean diameter of a repeating unit, a geometric index, G, related to optical anisotropy or birefringence, can be represented as follows:

$$G = 0.222 \left( \frac{1 + e_L}{1 + e_T} \right) \frac{L}{D}$$

wherein $e_L$, $e_T$, L and D have the meanings hereinbefore ascribed. Longitudinal eccentricity $e_L$ may be represented according to the following relationship $$e_L = \frac{\sqrt{X^2 - \frac{(Y + Z^2)}{2}}}{X}$$

Transverse eccentricity $e_T$ may be represented by the relationship $$e_T = \frac{\sqrt{Y^2 - Z^2}}{Y}$$

wherein the magnitude of vector Y is the larger of the Y and Z vectors. Ideally, transverse eccectricity $e_T$ will equal zero and longitudinal eccentricity $e_L$ will equal one, in which case, the eccentricity factor, E, will equal the theoretical maximum of two.

Geometric index G can be calculated for repeating units of a polymer of the present invention by resort to mean diameter and length values and longitudinal and transverse eccentricity values calculated from experimentally determined dihedral angles. It will be appreciated that the magnitude of values of length, mean diameter, longitudinal eccentricity and transverse eccentricity will materially influence the value of geometric index G. Thus, it will be appreciated that a repeating unit having, for example, a length of about twice that of a repeating unit having a different molecular structure and configuration will have a geometric index of about twice that of such different repeating unit. Accordingly, in making comparisons of geometric indices and magnitude thereof in relation to structural differences between comparative molecular repeating units, such differences in length should be borne in mind.

In general, experimentally determined birefringence values of materials comprises of repeating units as aforedescribed, will correlate directionally with values of geometric index, G, of the repeating units. Thus, recurring units having higher geometric index values will, in general, provide polymers exhibiting higher birefringence. Polymeric materials comprised of repeating units as aforedescribed will generally be comprised of repeating units having a geometric index value, G, of at least about 0.4. Preferred polymers of the present invention have a geometric index G of about 0.5 and exhibit birefringence in the range of about 0.1 to about 0.25.

The polymers of the present invention can be utilized in the construction of a variety of optical filter or other devices. Preferred devices are multilayer devices which include a layer of molecularly oriented and birefringent polymeric material and, in addition, at least one other layer of isotropic or birefringent material. The molecularly oriented polymers of the present invention exhibit birefringence and can be suitably employed in the construction of such devices. The additional layer of layers of such devices, whether isotropic or birefringent, will generally comprise materials having an index of refraction matching substantially one index of refraction of the birefringent polymer of the invention. For example, a layer of isotropic material having an index of refraction matching substantially one index of refraction of the highly birefringent layer can be suitably bonded to the layer of the birefringent polymer. A preferred device comprises a layer of the molecularly oriented and birefringent polymer of the invention bonded between two layers of isotropic material, the index of refraction of each isotropic layer constituting substantially a match with an index of refraction of the molecularly oriented birefringent polymer. Such a preferred device can be utilized for the polarization of light and may be termed a "total transmission" light polarizer, i.e., one which is particularly adapted to polarize a very large portion of incident light. Total polarizers find application in equipment such as may be employed for signaling, projection and display purposes, or the like, and in antiglare systems for automotive vehicles.

According to another application of the polymeric materials of the present invention, a plurality of alternating isotropic and birefringent layers can be utilized for the production of a multilayer light polarizing device, at least one of the layers of birefringent material comprising a molecularly oriented birefringent polymer as defined herein. Such a device can be utilized as a multilayer polarizer which partly transmits and partly reflects incident laight as separate linearly polarized components vibrating in orthogonal directions.

Optical devices in which the birefringent polymers of the invention can be utilized, and their methods for construction and modes of operation are described in detail in the U.S. patent application of H. G. Rogers, et al., Ser. No. 238,054, filed of even date herewith, now U.S. Pat. No. 4,446,305. Examples of other devices which can be adapted to include a polymeric birefringent layer as described herein are described, for example, in U.S. Pat. No. 3,506,333 (issued Apr. 14, 1970 to E. H. Land); in U.S. Pat. No. 3,213,753 (issued Oct. 26, 1965 to H. G. Rogers); in U.S. Pat. No. 3,610,729 (issued Oct. 5, 1971 to H. G. Rogers); in U.S. Pat. No. 3,473,013 (issued Oct. 14, 1969 to H. G. Rogers); in U.S. Pat. No. 3,522,984 (issued Aug. 4, 1970 to H. G. Rogers); in U.S. Pat. No. 3,522,985 (issued Aug. 4, 1970 to H. G. Rogers); in U.S. Pat. No. 3,528,723 (issued Sept. 15, 1970 to H. G. Rogers); and in U.S. Pat. No. 3,582,424 (issued June 1, 1971 to K. Norvaisa).

The following non-limiting examples are illustrative of the present invention.

EXAMPLE 1

To a round-bottomed flask, equipped with an addition funnel, mechanical stirrer and nitrogen inlet tube, was added 0.3325 grams (0.01307 mole) of hydrazine and 25 mls. of N-methylpyrrolidone. The contents were cooled to 0° C. with a cooling bath and a solution of 2.1418 grams (0.01307 mole) of α,α'-dimethylmuconic acid chloride in 6 mls. of tetrahydrofuran was added in dropwise manner. An additional 5 mls. of N-methylpyrrolidone utilized to rinse the addition funnel was added to the reaction flask. The temperature of the contents was observed to rise to 3° C. and then dropped to 0° C. To the flask were added 1.5072 grams (0.0204 mole) of lithium carbonate and the reaction mixture stirred at a temperature of 0° C. for 45 minutes during which time a light yellow solution was produced. The cooling bath was removed and the temperature rose to 25° C. over a 20-minute period. The reaction mixture was warmed gradually to 50° C. at which temperature it was heated and stirred for one hour. The reaction mixture was poured into a mixture of ice and water in a blender and a yellow fibrous solid was formed. The mixture was filtered and washed in the blender three times with water, three times with methanol and three times with ether. The resulting product was dried for 18 hours in a vacuum oven (78° C./15 mm.) to yield 1.72 grams of a yellow fibous solid polymer having the following recurring structural units:

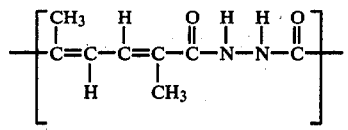

Molecular structure was confirmed by infrared and $C_{13}$-nuclear magnetic resonance analysis. Inspection of the ultraviolet/visible spectrum of the polymer (in 5% wt./vol. lithium chloride/dimethylacetamide) showed a $\lambda_{max}$ of 298 nm ($\epsilon = 12,000$) and an absorption peak at 390 nm ($\epsilon = 4300$).

The inherent viscosity of a polymer solution (0.5 gram of the polymer of this Example per 100 mls. of a solution of five grams lithium chloride per 100 mls. of dimethylacetamide) was 2.55 dl./gram at 30° C.

Thermogravimetric analysis showed that the onset of degradation of the polymer of this Example occurred at 345° C. in nitrogen and at 325° C. in air.

Polymeric films were prepared from the polymeric material of Example 1 by casting (onto glass plates) solutions of the polymeric material in a 50% wt./vol. solution of lithium chloride and dimethylacetamide (five grams lithium chloride per 100 mls. of dimethylacetamide). The concentration of polymer ranged from 1.0 to 5% wt./vol., i.e., from 1.0 gram to five grams polymer per 100 mls. of the lithium chloride/dimethylacetamide solution. In each instance, the glass plate carrying the puddle-cast polymer solution was immersed in water (after evaporation of solvent). The polymer film was observed to gel and an unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by index matching, was 1.68.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. Different strips were stretched under different conditions as follows: in air at 200° C. to an elongation of 21%; in steam to 30% elongation; and in boiling o-dichlorobenzene to 20% elongation. Birefringence results were 0.146 (air); 0.234 (steam); and 0.146 (p-dichlorobenzene).

EXAMPLE 2

A solution of 2.0375 grams (0.02034 mole) of 2-methylpiperzine and 4.3121 grams (0.04068 mole) of sodium carbonate in 50 mls. of water was added to a blender. The contents were vigorously stirred and a solution of 4.2117 grams (0.02034 mole) of α,α'-dimethylmuconic acid chloride in 40 mls. of chloroform. The reaction contents were stirred for five minutes. The solvent was evaporated and hexane and acetone were added and the mixture stirred in the blender. The resulting white chunk-like solid was washed with acetone and ether and dried in a vacuum oven (55° C./15 mm.) for 18 hours. The yield was 2.27 grams of a white solid having the following recurring structural units:

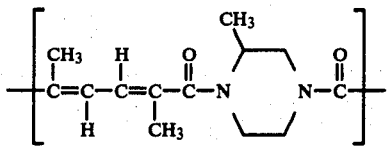

Elemental analysis provided the following:

|  | % C | % H | % N | % O |  |
|---|---|---|---|---|---|
| Calculated | 66.64 | 7.74 | 11.95 | 13.65 | |
| Found | 66.01 | 7.61 | 11.81 | 14.57 | (by difference) |

Molecular structure was confirmed by infrared and $C_{13}$-nuclear magnetic resonance analysis.

Inherent viscosity of the polymer of this Example in trifluoroacetic acid at 30° C. was 3.1 dl./gram and 3.8 dl./gram in trifluoroethanol at 30° C.

Thermogravimetric analysis showed that the onset of degradation of the polymer of this Example occurred at 415° C. in nitrogen and at 310° C. in air. Differential scanning calorimetry and thermal mechanical analysis of film samples detected a reproducible transition at 180° C.

Polymeric films of the polymer of this Example were prepared by puddle casting solutions of the polymer in a chloroform/methanol solvent onto a glass plate and immersing in water to provide a transparent, flexible and colorless film. Refractive index was 1.59.

Stretched polymeric films were prepared by soaking polymer films (prepared as hereinbefore described) for several hours for removal of organic solvent. Strips were cut and mounted between the jaws of a mechanical stretcher. Separate strips were stretched under different conditions as follows: in air at 200° C. to an elongation of 231%; in steam to 320% elongation; in boiling dimethylacetamide to 200% elongation; and in boiling o-dichlorobenzene to 170% elongation. Birefringence results were as follows: 0.16 (air); 0.12 (steam); 0.17 (dimethylacetamide); and 0.15 (o-dichlorobenzene).

EXAMPLE 3

An aqueous solution of 1.3040 grams (0.01142 mole) of 2,5-dimethylpiperazine and 2,1794 grams (0.02056 mole) of sodium carbonate in 60 mls. of water was added to a blender. To the blender were added 15 mls. of chloroform and the contents were rapidly stirred. To the stirring contents were added 2.1281 grams (0.01028 mole) of α,α'-dimethylmuconic acid chloride in 65 mls. of chloroform. A product of gel-like character was formed. The gel-like character was lost upon washing with hexane solvent. The product was washed with acetone and then ether. The product was dried for 18 hours in a vacuum oven (50° C./15 mm.). Yield was 2.32 grams of a white fibrous solids polymer having recurring units of the following structure:

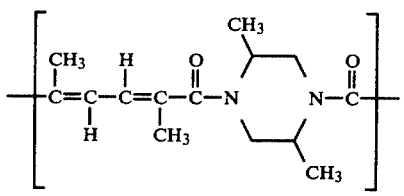

Molecular structure was confirmed by infrared and $C_{13}$-nuclear magnetic resonance analysis.

Thermogravimetric analysis showed that the onset of degradation of the polymer of this Example occurred at 415° C. in nitrogen and at 315° C. in air. Differential scanning calorimetry and thermal mechanical analysis of film samples detected a reproducible transition at about 171° C.

Inherent viscosity of a polymer solution in trifluoroethanol at 30° C. was 2.67 dl./gram.

Polymeric films were prepared by puddle casting a solution of the polymer of this Example in a chloroform/methanol solvent mixture onto a glass plate, and after evaporation of solvent, immersing the slide in water. Colorless, slightly hazy films were obtained. Refractive index was 1.53. The films were soaked to remove solvent and cut into strips for stretching between the jaws of a mechanical stretcher. Different strips were stretched under the following conditions: in air at 200° C. to 38% elongation; in steam to 172% elongation; in boiling dimethylacetamide to 150% elongation; and in boiling o-dichlorobenzene to 147% elongation. Birefringence values were obtained as follows: 0.04 (in air); 0.18 (in steam); 0.09 (in dimethylacetamide); and 0.04 (in o-dichlorobenzene).

EXAMPLE 4

An aqueous solution of 6.8004 grams (0.07895 mole) of piperazine and 15.0626 grams (0.1421 mole) of sodium carbonate in 230 mls. of water was added to a blender. The contents were stirred rapidly and 14.7119 grams (0.07105 mole) of α,α'-dimethylmuconic acid chloride in 315 mls. of chloroform were added. The contents were stirred for ten minutes. The product was filtered and washed with acetone, then ether. The product was dried for 18 hours in a vacuum oven (55° C./15 mm.). Yield was 14.41 grams of a solid polymer having recurring units of the following structure:

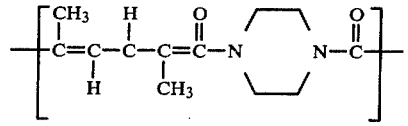

Elemental analysis provided the following:

|  | % C | % H | % N | % O |  |
|---|---|---|---|---|---|
| Calculated | 65.43 | 7.32 | 12.72 | 14.53 | |
| Found | 64.55 | 7.47 | 12.74 | 15.24 | (by difference) |

Molecular structure was confirmed by infrared and $C_{13}$-nuclear magnetic resonance analysis.

Thermogravimetric analysis showed that the onset of degradation of the polymer of this Example occurred at 415° C. in nitrogen and at 360° C. in air. Differential scanning calorimetry and thermal mechanical analysis of film samples detected a reproducible transition at about 180° C.

Inherent viscosity of a polymer solution in trifluoroethanol at 30° C. was 1.51 dl./gram and, in trifluoroacetic acid at 30° C., was 3.20 dl./gram.

Polymeric films were prepared by puddle casting a solution of the polymer of this Example in trifluoroethanol solvent onto a glass plate, and after evaporation of solvent, immersing the slide in water. Colorless, slightly hazy films were obtained. The films were soaked to remove solvent and cut into strips for stretching between the jaws of a mechanical stretcher. Stretching in steam to an elongation of 170% provided strips having a birefringence of 0.05.

EXAMPLE 5

An aqueous solution of 1.2552 grams (0.01099 mole) of 2,5-dimethylpiperazine and 2.3299 grams (0.02198 mole) of sodium carbonate in 45 mls. of water was added to a blender. Thereupon 7 mls. of chloroform were added and the contents were vigorously stirred. To the blender were added 1.9676 grams (0.01099 mole) of muconic acid chloride and the reaction mixture was stirred for five minutes. To the reaction mixture was added hexane to precipitate the formed polymer and to eliminate the gel-like character of the product. The product was filtered, washed with acetone and washed with ether. The product was dried in a vacuum oven for 18 hours (50° C./15 mm.). The resulting polymer (12.42 grams) was a yellow powder having recurring units of the following structure:

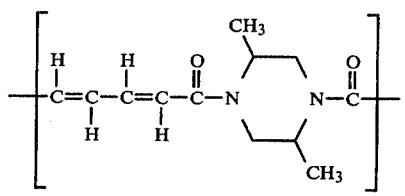

Thermogravimetric analysis showed that the onset of degradation of the polymer of this Example occurred at 400° C. in nitrogen and at 325° C. is air. Differential scanning calorimetry and thermal mechanical analysis of film samples detected a reproducible transition at about 175° C.

EXAMPLE 6

An aqueous solution of 0.8967 grams (0.01041 mole) of piperazine and 2.2069 grams (0.02082 mole) of sodium carbonate in 30 mls. of water was added to a blender. Thereupon 10 mls. of chloroform were added and the contents were vigorously stirred. To the blender were added 1.8634 grams (0.01041 mole) of muconic acid chloride in 50 mls. of chloroform and the reaction mixture was stirred for ten minutes. The resulting polymeric product was filtered, washed with acetone and washed with ether. The product was dried in a vacuum oven for 18 hours (40° C./15 mm.). The resulting product (2.001 grams) was a polymer having recurring units of the following structure:

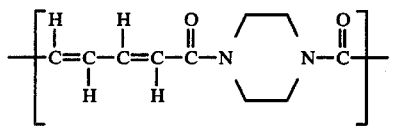

Molecular structure was confirmed by infrared and $C_{13}$-nuclear magnetic resonance analysis. Elemental analysis provided the following results:

|  | % C | % H | % N | % O |  |
|---|---|---|---|---|---|
| Calculated | 62.49 | 6.29 | 14.57 | 16.65 |  |
| Found | 54.35 | 6.09 | 12.71 | 26.85 | (by difference) |

Inherent viscosity for the polymer of this Example was 0.78 dl./gram (in trifluoroacetic acid at 38° C.) and 1.04 dl./gram (in trifluoroethanol at 30° C.).

Thermogravimetric analysis showed that the onset of degradation occurred at 400° C. in nitrogen and at 305° C. in air. Differential scanning calorimetry and thermal mechanical analysis of film samples showed a reproducible transition at about 170° C.

Polymeric films were formed by puddle casting a solution of the polymer in trifluoroethanol onto a glass plate and immersing the plate into water. Brittle and opaque films resulted.

EXAMPLE 7

An aqueous solution of 1.2605 grams (0.01258 mole) of 2-methylpiperazine and 2.5334 grams (6.02390 mole) of sodium carbonate in 50 mls. of water was added to a blender. Thereupon 10 mls. of chloroform were added and the contents were vigorously stirred. To the blender were added 2.1398 grams (0.01195 mole) of muconic acid chloride in 70 mls. of methylene chloride and the reaction mixture was stirred for five minutes. The gel-like product was filtered, washed with acetone and washed with ether. The product was dried in a vacuum oven for 18 hours (45° C./15 mm.). The resulting product (1.49 grams) was a polymer having recurring units of the following structure

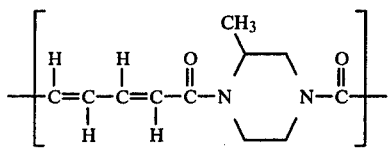

Molecular structure was confirmed by infrared and $C_{13}$-nuclear magnetic resonance analysis.

Inherent viscosity of the polymer of this Example was 0.91 dl./gram (in trifluoroacetic acid at 30° C.) and 0.94 dl./gram (in trifluoroethanol at 30° C.).

Thermogravimetric analysis showed that the onset of degradation of the polymer of this Example occurred at 380° C. in nitrogen and at 325° C. in air. Differential scanning calorimetry and thermal mechanical analysis of film samples detected no reproducible transition.

Polymeric films were prepared by puddle casting a solution of the polymer of this Example in trifluoroethanol onto a glass slide and immersing the slide into water. The resulting films were opaque and exhibited a brittle quality.

EXAMPLE 8

An aqueous solution of 2.1238 grams (0.03785 mole) of potassium hydroxide and 3.0102 grams (0.01893 mole) of 1,4-diamino-2-butene dihydrochloride in 75 mls. of water was placed into a blender. To the blender were added 40 mls. of methylene chloride and the contents were vigorously stirred. A solution of 2.258 grams (0.01262 mole) of muconic acid chloride in 70 mls. of methylene chloride was added all at once to the stirring contents of the blender. Stirring was continued for five minutes. The reaction product was filtered and the polymer was washed with acetone, then with ether. The polymer was dried in a vacuum oven for 18 hours (60° C./15 mm.). The yield was 1.629 grams of a white polymer having recurring units of the following structure:

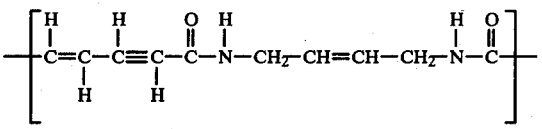

Molecular structure was confirmed by infrared and $C_{13}$-nuclear magnetic resonance analysis.

Elemental analysis provided the following results:

|  | % C | % H | % N | % O |  |
|---|---|---|---|---|---|
| Calculated | 62.49 | 6.29 | 14.57 | 16.65 |  |
| Found | 58.36 | 6.33 | 14.06 | 21.25 | (by difference) |

Inherent viscosity of the polymer of this Example was 0.61 dl./gram in trifluoroacetic acid at 30° C.

Thermogravimetric analysis showed that the onset of degradation of the polymer of this Example occurred at 350° C. in nitrogen. Differential scanning calorimetry and thermal mechanical analysis of film samples detected no reproducible glass transition temperature.

Polymeric films were formed by puddle casting a solution of the polymer of this Example in trifluoroethanol onto a glass plate and immersing the plate into water. The resulting films were colorless, mechanically weak and opaque Exposure to ambient light for about 24 hours produced a yellowing effect.

EXAMPLE 9

An aqueous solution of 3.0494 grams (0.01917 mole) of 1,4-diamine-2-butenedihydrochloride and 4.5484 grams (0.03834 mole) of potassium hydroxide in 80 mls. of water was added to a blender. To the blender were added 40 mls. of carbon tetrachloride and the contents were rapidly stirred. To the stirring contents were added at one time 2.6462 grams (0.01278 mole) of α,α'-dimethylmuconic acid chloride in 70 mls. of carbon tetrachloride. The reaction mixture thickened immediately. After stirring for ten minutes, the reaction mixture was filtered and washed with ether and then acetone. The product was dried for 18 hours in a vacuum oven (60° C./15 mm.). Yield was 1.75 grams of a white slightly fibrous solid polymer having recurring units of the following structure:

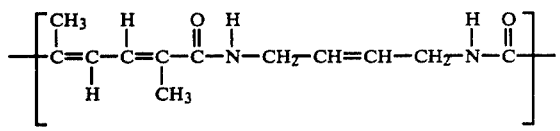

Molecular structure was confirmed by infrared and C$_{13}$-nuclear magnetic resonance analysis.

Elemental analysis provided the following results:

| | % C | % H | % N | % O | |
|---|---|---|---|---|---|
| Calculated | 65.43 | 7.32 | 12.72 | 14.53 | |
| Found | 60.13 | 6.83 | 11.55 | 21.49 | (by difference) |

Thermogravimetric analysis showed that the onset of degradation of the polymer of this Example occurred at 370° C. in nitrogen. Differential scanning calorimetry and thermal mechanical analysis of film samples detected a reproducible transition at about 120° C.

Inherent viscosity of a polymer solution in trifluoroacetic acid at 30° C. was 0.55 dl./gram and 1.12 dl./gram in 5% wt./vol. lithium chloride in dimethylacetamide.

Polymeric films were prepared by puddle casting a solution of the polymer of this Example in trifluoroethanol solvent onto a glass plate, and after evaporation of solvent, immersing the slide in water. Colorless, slightly opaque films having a slightly elastic character were obtained. Birefringent strips were obtained by soaking the polymeric films in water to remove solvent, cutting strips therefrom and stretching between the jaws of a mechanical stretcher.

What is claimed is:

1. A film- or fiber-forming polymer comprising recurring units of the formula:

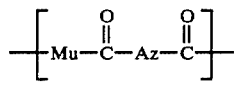

where Mu is a divalent radical having the formula

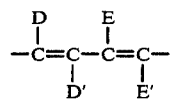

where each of D, D', E and E' is hydrogen, alkyl or substituted-alkyl; and Az is a divalent radical having the formula

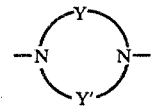

where each of Y and Y' represent the atoms necessary to complete with the nitrogen atoms to which they are bonded a piperazine or substituted-piperazine radical.

2. The film- or fiber-forming polymer of claim 1 wherein each of D, D', E and E' is hydrogen.

3. The film- or fiber-forming polymer of claim 2 wherein each of Y and Y' represent the atoms necessary to complete with the nitrogen atoms to which they are bonded the piperazine radical.

4. The film- or fiber-forming polymer of claim 2 wherein each of Y and Y' represent the atoms necessary to complete with the nitrogen atoms to which they are bonded the 2-methylpiperazine radical.

5. The film- or fiber-forming polymer of claim 2 wherein each of Y and Y' represent the atoms necessary to complete with the nitrogen atoms to which they are bonded the 2,5-dimethylpiperazine radical.

6. The film- or fiber-forming polymer of claim 1 wherein each of D and E' is methyl and each of D' and E is hydrogen.

7. The film- or fiber-forming polymer of claim 6 wherein each of Y and Y' represent the atoms necessary to complete with the nitrogen atoms to which they are bonded the piperazine radical.

8. The film- or fiber-forming polymer of claim 6 wherein each of Y and Y' represent the atoms necessary to complete with the nitrogen atoms to which they are bonded the 2-methylpiperazine radical.

9. The film- or fiber-forming polymer of claim 6 wherein each of Y and Y' represent the atoms necessary to complete with the nitrogen atoms to which they are bonded the 2,5-dimethylpiperazine radical.

10. A birefringent molecularly oriented polymer in the form of a film or fiber comprising recurring units of the formula:

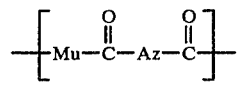

where Mu is a divalent radical having the formula

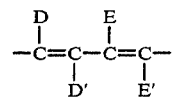

where each of D, D', E and E' is hydrogen, alkyl or substituted-alkyl; and Az is a divalent radical having the formula

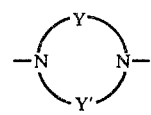

where each of Y and Y' represent the atoms necessary to complete with the nitrogen atoms to which they are bonded a piperazine or substituted-piperazine radical.

11. The birefringent molecularly oriented polymeric film or fiber of claim 10 wherein each of D, D', E and E' is hydrogen.

12. The birefringent molecularly oriented polymeric film or fiber of claim 11 wherein each of Y and Y' represent the atoms necessary to complete with the nitrogen atoms to which they are bonded a substituted-piperazine radical selected from the group consisting of piperazine, 2-methylpiperazine and 2,5-dimethylpiperazine.

13. The birefringent molecularly oriented polymeric film or fiber of claim 10 wherein each of D and E' is methyl and each of D' and E is hydrogen.

14. The birefringent molecularly oriented polymeric film or fiber of claim 13 wherein each of Y and Y' represent the atoms necessary to complete with the nitrogen atoms to which they are bonded the piperazine radical.

15. The birefringent molecularly oriented polymeric film or fiber of claim 13 wherein each of Y and Y' represent the atoms necessary to complete with the nitrogen atoms to which they are bonded the 2-methylpiperazine radical.

16. The birefringent molecularly oriented polymeric film or fiber of claim 13 wherein each of Y and Y' represent the atoms necessary to complete with the nitrogen atoms to which they are bonded the 2,5-dimethylpiperazine radical.

17. The birefringent molecularly oriented polymer of claim 10 in the form of a unidirectionally stretched film or fiber.

* * * * *